(No Model.)

J. J. MARSHALL.
Grub and Stump Puller.

No. 229,437. Patented June 29, 1880.

WITNESSES:
Francis McArdle
C. Sedgwick

INVENTOR:
J. J. Marshall
BY Munn & Co.
ATTORNEYS.

UNITED STATES PATENT OFFICE.

JOSEPH J. MARSHALL, OF PULASKI, TENNESSEE.

GRUB AND STUMP PULLER.

SPECIFICATION forming part of Letters Patent No. 229,437, dated June 29, 1880.

Application filed March 24, 1880. (No model.)

*To all whom it may concern:*

Be it known that I, JOSEPH J. MARSHALL, of Pulaski, in the county of Giles and State of Tennessee, have invented a new and useful Improvement in Grub and Stump Pullers, of which the following is a specification.

My invention consists in a novel construction and arrangement with relation to each other of the arms which form the jaws, whereby lightness, strength, and efficiency are obtained.

Figure 1:
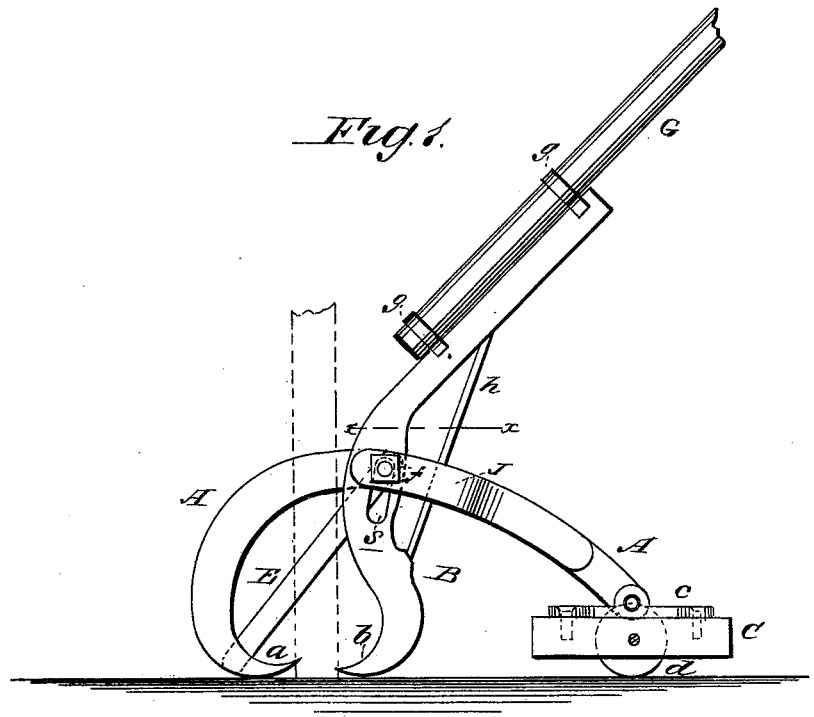
Figure 2:
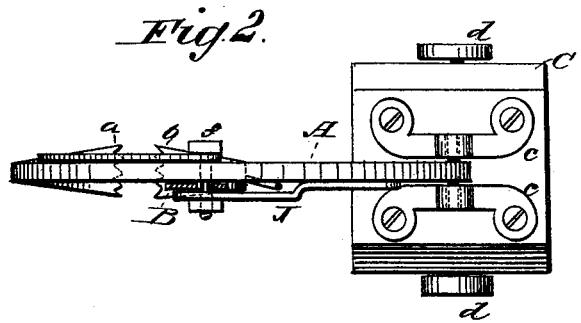

In the accompanying drawings, Figure 1 is a side view of the implement in position for use. Fig. 2 is a top view of the same.

Similar letters of reference indicate corresponding parts.

A represents the fixed arm or jaw, and B the movable one. The fixed arm has its lower end pivoted in brackets *c c* on a block, C, which may be provided with wheels *d d*. The remainder of the arm is curved, and its other end is of hook-like form and terminates in a wedge-shaped and toothed jaw, *a*.

E is a brace, consisting of a bar extending from near the jaw *a* to a point about midway of the length of the arm A, for the purpose of strengthening the hook portion. The lower end of the brace E is secured by a rivet, and the upper end is secured by a bolt, *f*, which forms the pivot and fulcrum for the movable arm B. This movable arm is also provided with a tapering and toothed jaw, *b*, above which the arm is curved backward to a straight portion, which is provided with rings *g* for the reception of a wooden handle, G. A brace, *h*, extends across the curved portion for the purpose of strengthening the arm B. In the curved portion is a slot, *s*, through which the bolt *f* passes. This bolt also passes through the front end of a bar, J, the rear end of which is secured to the arm A. The movable arm B works between the arm A and bar J, and thus a firm and strong fulcrum is secured.

By means of the slot *s* the movable jaw *b* can be adjusted to accommodate grubs or stumps of various sizes, and always occupy the proper position with relation to the fixed jaw *a*.

By means of the wheels on the block C the implement may be readily moved from place to place. Said block C forms a prime fulcrum for the compound lever formed by the two arms.

Having thus fully described my invention, I claim as new and desire to secure by Letters Patent—

The combination of the fixed arm A, having the tapering toothed jaw *a*, and provided with the brace E, the movable arm B, having the tapering toothed jaw *b* and the slot *s*, and provided with the brace *h*, the strengthening-bar J, and the bolt *f*, as herein shown and described.

JOSEPH J. MARSHALL.

Witnesses:
W. H. ABERNATHY,
W. F. ALEXANDER.